United States Patent [19]
Soto

[11] Patent Number: 6,092,438
[45] Date of Patent: Jul. 25, 2000

[54] AERODYNAMIC BICYCLE STEERING DEVICE

[75] Inventor: Carlos Soto, Santa Barbara, Calif.

[73] Assignee: Trek Bicycle Corporation, Waterloo, Wis.

[21] Appl. No.: 09/189,693

[22] Filed: Nov. 10, 1998

[51] Int. Cl.[7] .................................................. B62K 21/12
[52] U.S. Cl. ...................... 74/551.8; 74/551.1; D12/178
[58] Field of Search ............................. 74/551.1–551.8; D12/178, 114, 111; 280/261, 279, 283

[56] References Cited

U.S. PATENT DOCUMENTS

| | | | |
|---|---|---|---|
| D. 98,651 | 2/1936 | Kraeft | D12/178 |
| D. 99,848 | 6/1936 | Anderson | D12/178 |
| D. 104,819 | 6/1937 | Snell | D12/178 |
| D. 154,343 | 6/1949 | Smith | D12/178 |
| D. 179,273 | 11/1956 | Stevens | D12/178 |
| D. 301,027 | 5/1989 | Borromeo | D12/178 |
| D. 315,328 | 3/1991 | Giard, Jr. | D12/178 |
| D. 323,805 | 2/1992 | Giard, Jr. | D12/178 |
| D. 332,768 | 1/1993 | Giard, Jr. | D12/178 |
| D. 334,164 | 3/1993 | Klieber | D12/178 |
| 2,143,234 | 1/1939 | Anderson | 74/551.1 |
| 4,750,754 | 6/1988 | Lennon | 280/261 |
| 4,873,886 | 10/1989 | Renner | 74/551.8 |
| 4,878,397 | 11/1989 | Lennon | 74/551.1 |
| 5,000,469 | 3/1991 | Smith | 280/261 |
| 5,024,119 | 6/1991 | Linden | 74/551.1 |
| 5,033,325 | 7/1991 | Giard, Jr. | 74/551.3 |
| 5,083,476 | 1/1992 | Borromeo | 74/551.1 |
| 5,145,210 | 9/1992 | Lennon | 280/281.1 |
| 5,154,094 | 10/1992 | Klieber | 74/551.1 |
| 5,154,095 | 10/1992 | Giard, Jr. | 74/551.8 |
| 5,163,339 | 11/1992 | Giard, Jr. et al. | 74/551.3 |
| 5,209,508 | 5/1993 | Lennon | 280/261 |
| 5,235,872 | 8/1993 | Giard, Jr. | 74/551.8 |
| 5,319,994 | 6/1994 | Miller | 74/551.8 |
| 5,324,059 | 6/1994 | Bryne | 280/283 |
| 5,326,122 | 7/1994 | Duffy | 280/288.4 |
| 5,782,139 | 7/1998 | Fraiman | 74/551.1 |

FOREIGN PATENT DOCUMENTS

| | | | |
|---|---|---|---|
| 2668745 | 5/1992 | France | 74/551.8 |
| 4022434 | 1/1992 | Germany | 74/551.8 |

*Primary Examiner*—Vinh T. Luong
*Attorney, Agent, or Firm*—Boyle Fredrickson Ziolkowski S.C.; James F. Boyle

[57] ABSTRACT

An aerodynamic steering device for a bicycle includes a series of flat, non-hollow, planar surfaces, including of a first portion having a forward end portion and a rearward end portion, a second portion extending laterally outward from the rearward end portion of the first portion and including first and second forearm support surfaces, and a third portion extending forwardly and upwardly from the forward end portion of the first portion to provide first and second forwardly tilted hand gripping surfaces. The device further includes a clamping mechanism for clamping the steering device directly to the steering post of a bicycle, or alternatively to an auxiliary set of handlebars. The steering device is comprised of flat structural sheet members which provide a minimum frontal silhouette, which is especially advantageous in bicycle racing.

15 Claims, 5 Drawing Sheets

AERODYNAMIC BICYCLE STEERING DEVICE

BACKGROUND OF THE INVENTION

1. Field of the Invention

This invention relates to bicycles, and in particular to an aerodynamic steering device for a bicycle.

2. Background of the Related Art

The design of racing bicycles, or other special purpose bicycles, involves many nuances which are often not recognized by inexperienced riders. Structural changes which may at first seem minor to an untrained rider can provide a significant improvement in performance of either the bicycle itself, the rider, or as occurs in many instances both. This improved performance can provide a recognizable advantage in bicycle racing, especially in competition of extended duration or length. In both sprint and long distance racing, a minimal frontal silhouette should be presented. The frontal silhouette refers to the combined frontal area of the bicycle and the bicycle rider. To reduce drag caused by air resistance and turbulence, the bicycle preferably is made of aerodynamic structural members, and the rider should be leaning forward with his or her head bent low near the handlebar and the torso nearly parallel to the ground. The position of the bicycle rider must also be comfortable so that the rider can produce the necessary high level of effort and performance for a long duration.

The rider's position is greatly affected by the position, shape and arrangement of the handlebar. For example, a bicycle having handlebar grips located in a relatively raised position will cause the rider to assume a relatively upright riding position. While an upright position may be comfortable, the large frontal silhouette presented by the rider produces a great amount of air resistance and drag which minimizes top speed even when the rider produces a large amount of pedalling effort. Conversely, a bicycle having relatively low handlebar grips encourages the rider to assume a position in which the frontal silhouette is minimized. The small frontal silhouette of course reduces drag which enables the rider to achieve a higher top speed with less effort.

There have been of course a number of bicycle handlebars designed especially for racing. The devices disclosed in U.S. Pat. No. 4,878,397 issued to Dan C. Lennon and U.S. Pat. No. 5,154,095 issued to Edward H. Giard, Jr., are examples of racing handlebars. These devices are, however, constructed from tubular structural members which present blunt surfaces that cause a relatively high amount of turbulence and drag, which of course reduces speed. Because of the natural desire for ever greater speeds in bicycle racing, an improved aerodynamic bicycle handlebar is desired.

SUMMARY OF THE INVENTION

An improved aerodynamic bicycle handlebar is presented.

In accordance with the principal objects of the invention, the novel aerodynamic handlebar presented herein is comprised of a series of flat non-hollow planar structural surfaces which present a minimal frontal silhouette for the handlebar, especially in comparison to traditional tubular-type handlebars. The invention further provides a uniquely designed structure for supporting the rider's hands and arms in an optimal position for high speed, long distance bicycle racing. The primary object of the invention is to provide a bicycle handlebar for use by the rider in assuming an aerodynamic profile, and the aerodynamic profile of the handlebar itself has also been optimized.

Experienced riders will recognize the increased speeds and improved performance made possible by the invention disclosed herein. Other objects, features and advantages of the present invention will become evident to those skilled in the art from the following detailed description and accompanying drawings.

BRIEF DESCRIPTION OF THE DRAWINGS

The drawings, which constitute a part of this specification and include an exemplary embodiment of the present invention, include the following.

DETAILED DESCRIPTION OF THE PREFERRED EMBODIMENT

Figure 1:
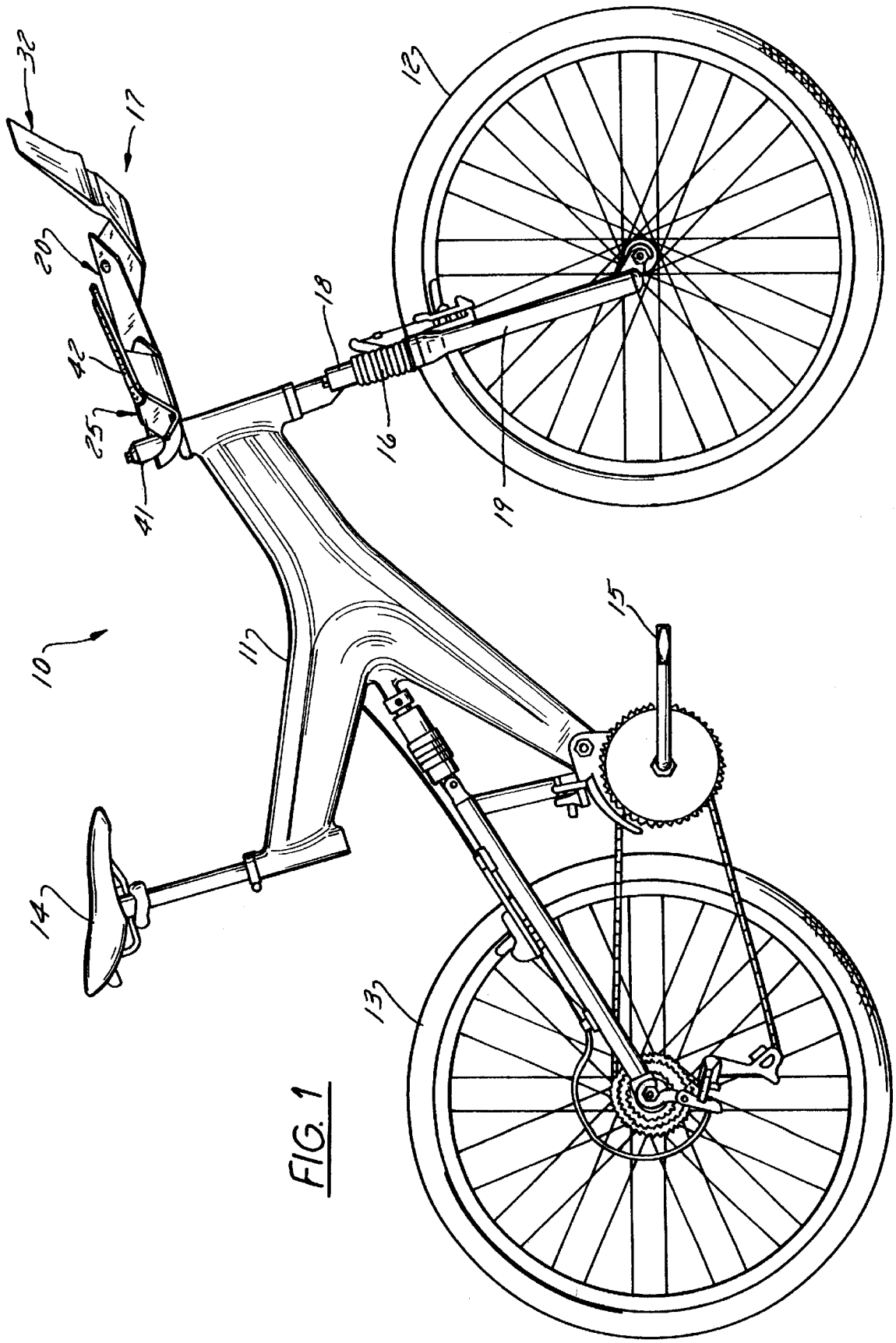
FIG. 1 is a side elevation view of a bicycle which includes the aerodynamic handlebar of the present invention.
Figure 3:
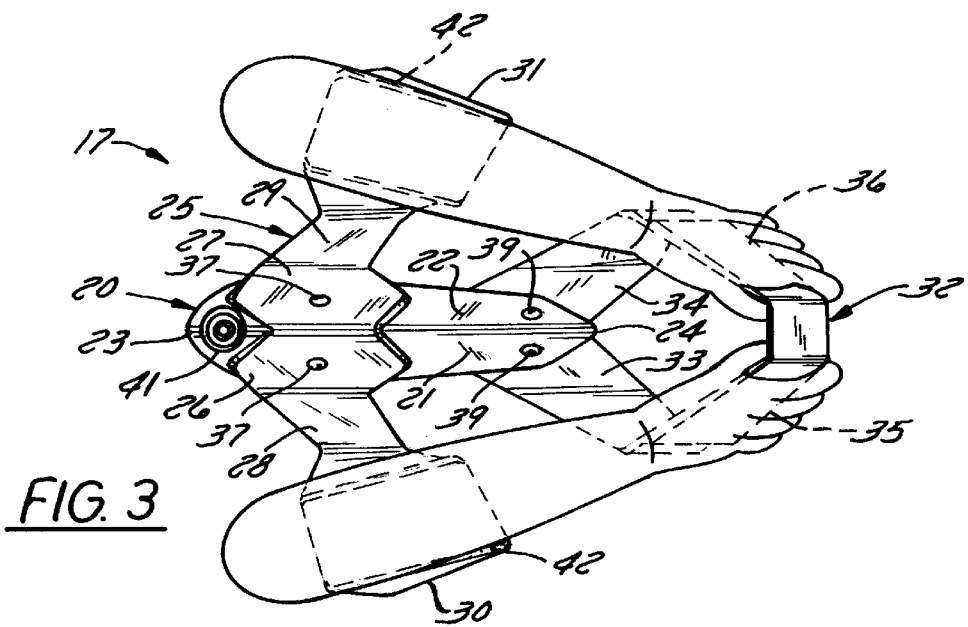
FIG. 3 is a top view of the aerodynamic bicycle handlebar presented herein, further showing the position of the rider's arms relative to line 3—3 of FIG. 2.
Figure 2:
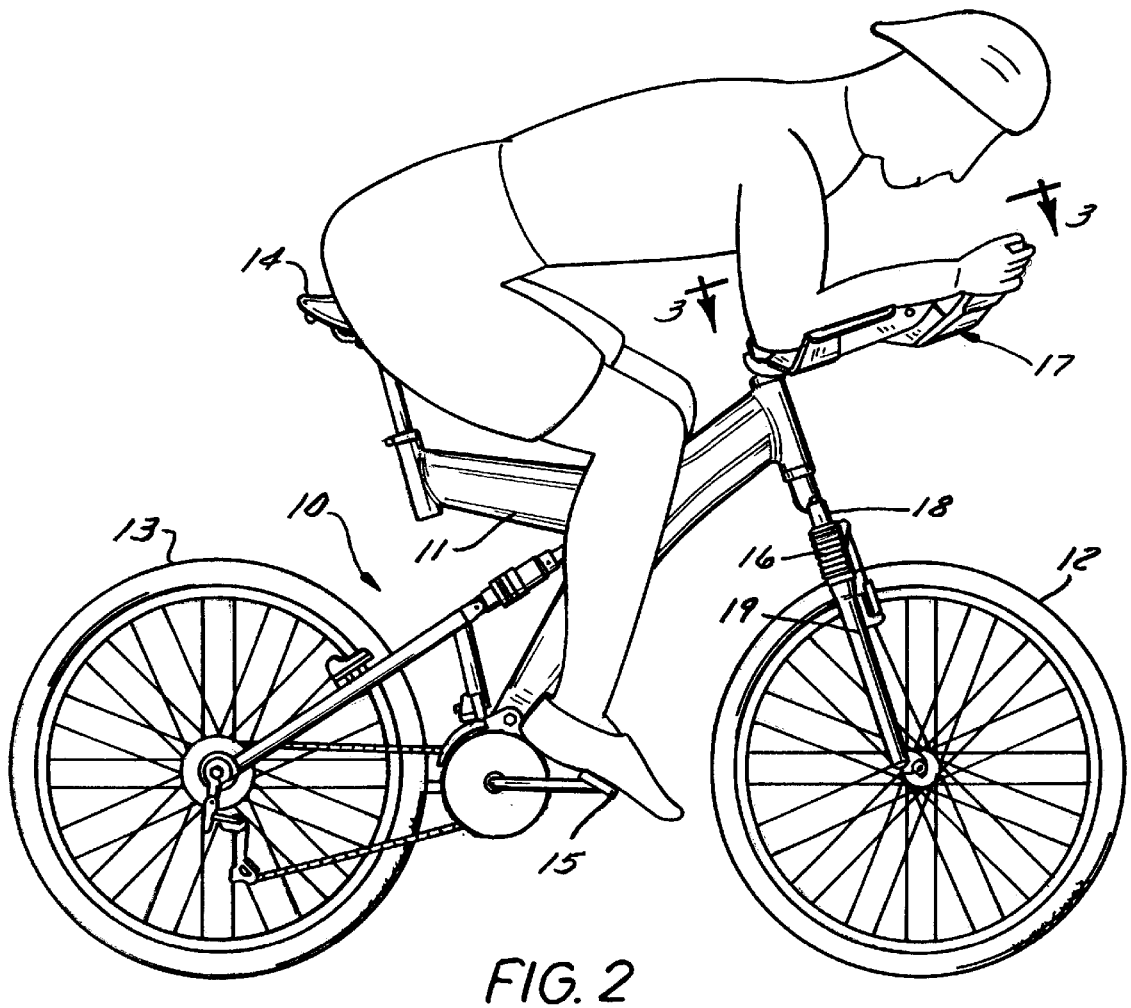
FIG. 2 is a side view of a bicycle showing a bicycle rider crouched forward in a racing position.

A traditional two-wheeled bicycle 10 normally includes a frame 11, a front wheel 12, a rear wheel 13, a seat 14, pedals 15 and a steering assembly comprised of a steering fork 16 and handlebar 17. The steering fork 16 includes a crown 17, two downwardly extending front fork stays 20 to which the front wheel is attached, and an upwardly extending steering post which is inserted through the neck of the frame. FIGS. 1 and 2 depict what is commonly referred to as a full suspension bicycle, which is shown here merely for illustrative purposes. The present invention of an aerodynamic handlebar 20 could of course be used on a wide array of bicycle frame designs, and it is intended especially for use on any bicycle involved in racing.

Instead of the relatively wide tubular members traditionally used in the construction of handlebars, the present invention of an aerodynamic handlebar 17 is comprised of a series of flat planar structural surfaces. The flat planar structural surfaces may be also characterized as relatively thin non-hollow structural members. As will be described in greater detail below, the present invention is comprised of a multitude of flat planar structural surface portions that are arranged in a particular way relative to each other. As such, the present invention of an aerodynamic bicycle steering device may be fabricated from a single contiguous metallic member, or alternatively from two, three, four or more separate members assembled together. Additionally, in comparison to the rounded and relatively blunt forward surface found on virtually all conventional tubular handlebars, the forward surface of the flat planar structural surfaces employed in the present invention is instead a thin linear edge that slices through the air, thereby providing a highly aerodynamic bicycle steering device.

Figure 4:
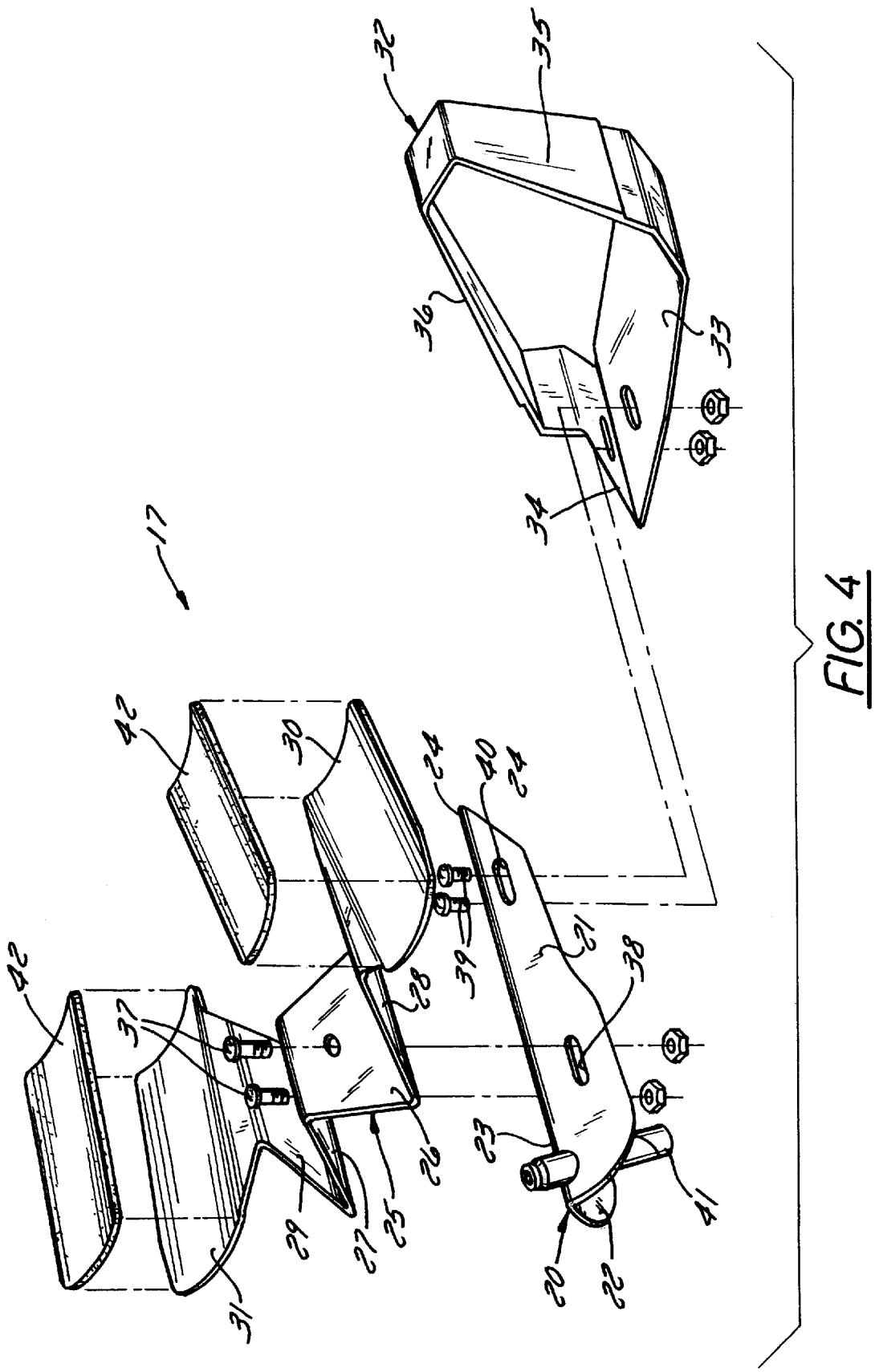
FIG. 4 is an exploded perspective view of one embodiment of the present invention.
Figure 5:
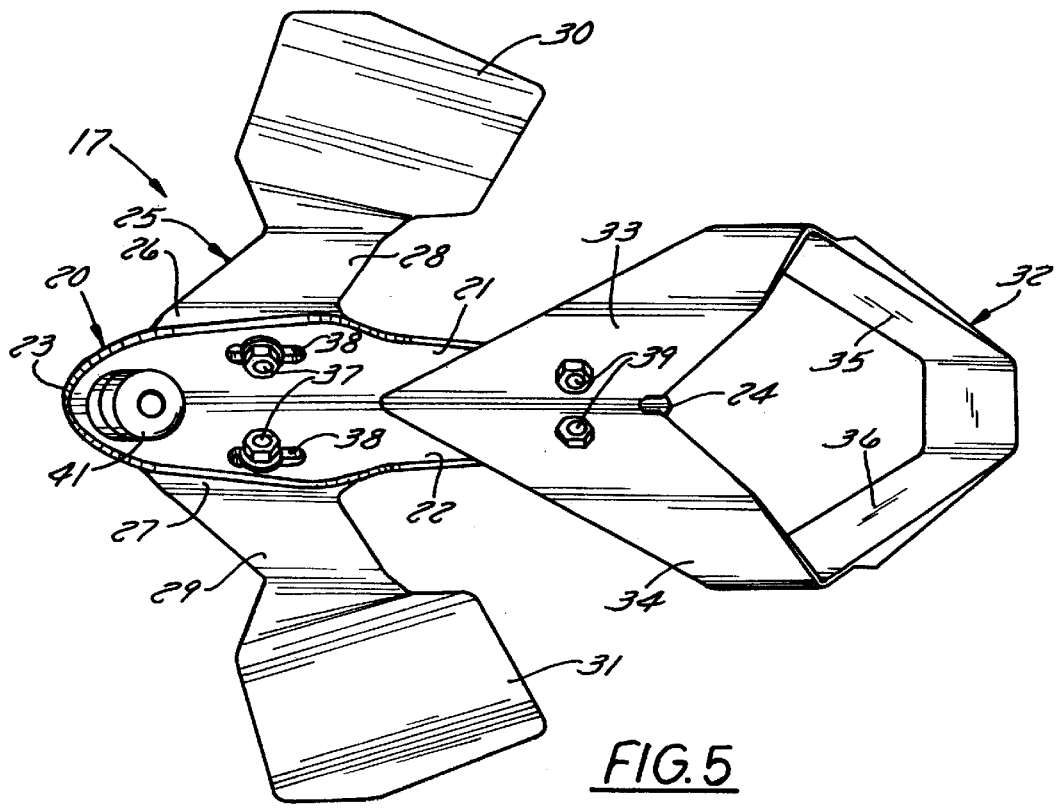
FIG. 5 is a bottom view of the aerodynamic bicycle handlebar presented herein.
Figure 6:
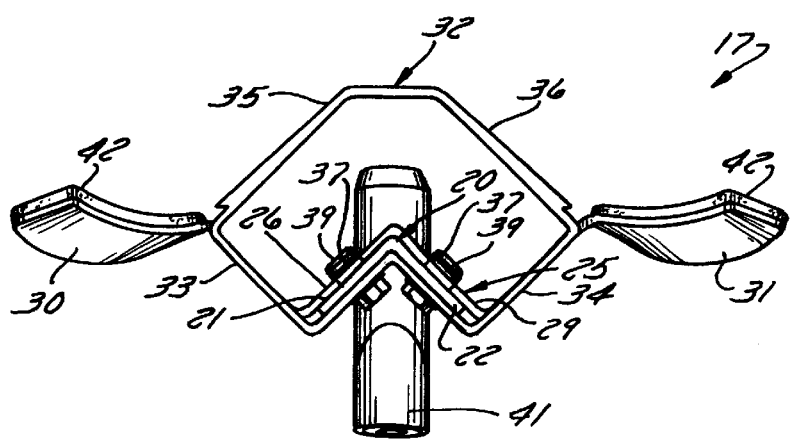
FIG. 6 is a front view of the handlebar.
Figure 7:
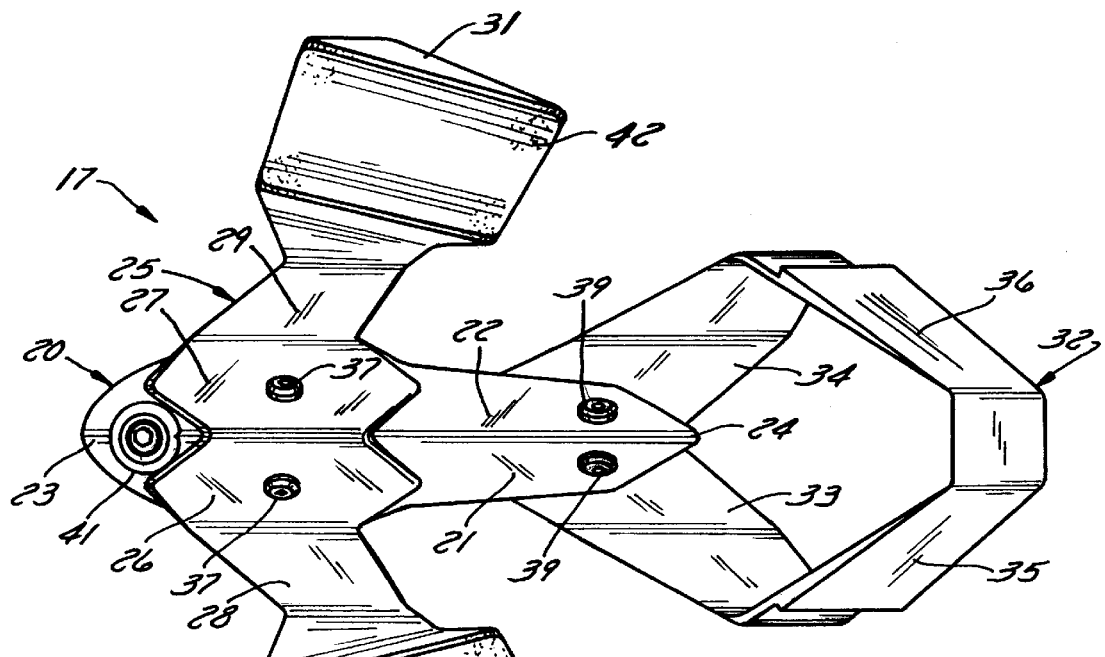
FIG. 7 is a top view of the handlebar.
Figure 8:
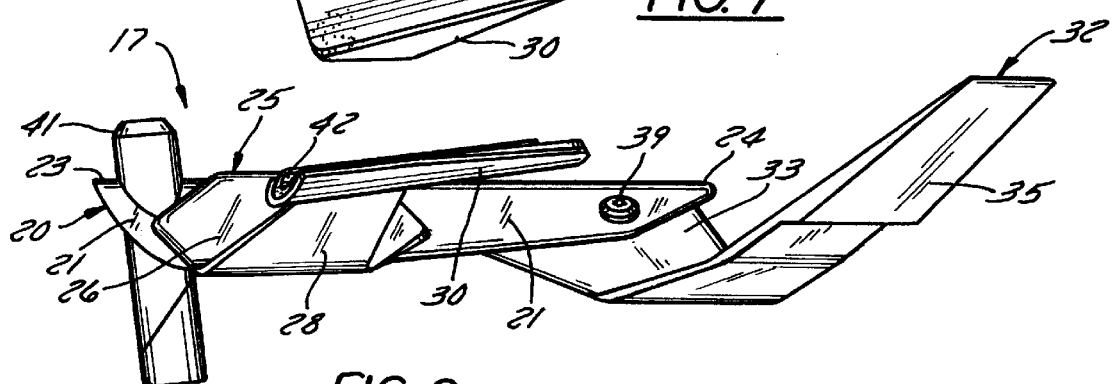
FIG. 8 is a side view of the handlebar.
Figure 9:
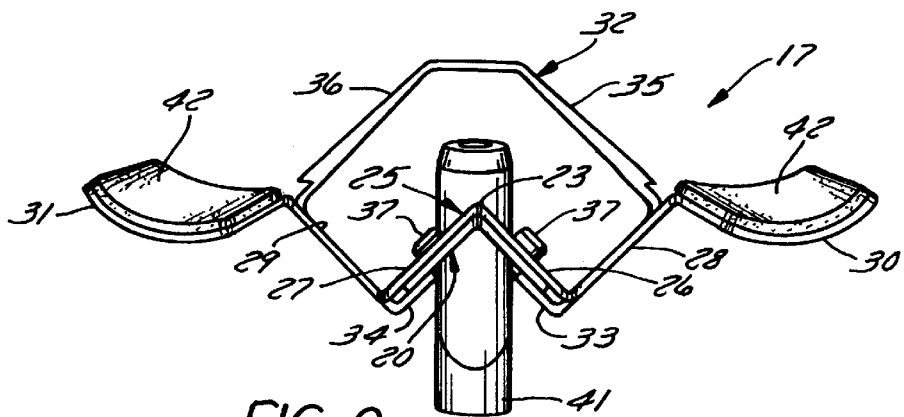
FIG. 9 is a rear view of the handlebar.

Referring in particular to the embodiment of the present invention shown in FIG. 4, that embodiment of the invention is comprised structurally of essentially three members or portions. The first member 20 is an elongated structural member having a first planar side portion 21 and a second planar side portion 22. The first planar side portion 21 is angularly offset relative to the second planar side portion 22. The angle between the first and second planar side portions extends lengthwise down the center of the elongated structural member in the direction that the bicycle travels. The first member 20 further includes a rearward end portion 23 for attaching the steering device to the bicycle, and a forward end portion 24. The first member 20 may, for example, be constructed from a metallic sheet material bended to the appropriate angle shown in, for example, FIG. 4.

The second member 25 extends from the rear end portion 23 of the first member 20 laterally outwardly to provide support surfaces for the rider's forearms. Specifically, the second member 25 is a structural member having a first central portion 26 and a second central portion 27. The first central portion 26 is angularly offset from the second central portion 27 so that the angle between the first and second central portions of the second member correspond to the angle between the first and second planar side portions of the first member. In that way, the first member 20 and second member 25 attach snugly to each other.

The second member 25 further includes a first lateral portion 28 extending laterally outwardly from the first central portion 26 for supporting a first forearm support surface 30. The second member 25 further includes a second lateral portion 29 extending laterally outwardly from the second central portion 27 for supporting a second forearm support surface 31. The first and second forearm support surfaces have a slightly rounded upper surface conforming to the rounded shape of a rider's forearm. The first and second forearm support surfaces are also preferably provided with foam cushion pads 42 for the rider's comfort. The first and second central portions, first and second lateral portions, and first and second forearm support surfaces are of the second member likewise all planar surfaces which may be similarly constructed from a separate metallic sheet material.

The third member 32 is likewise comprised of a structural member made of flat planar surfaces including forwardly tilted hand gripping surfaces. Specifically, the third member 32 is comprised of a first attachment portion 33 and a second attachment portion 34. The first attachment portion 33 is angularly offset from the second attachment portion 34 so that the angle between the first and second attachment portions of the third member correspond to the angle between the first and second side portions of the first member. In that way, the first and third members may be fitted securely to each other. The third member 32 further includes a first hand gripping portion 35 extending forwardly and upwardly from the first attachment portion 33. The third member 22 further includes a second hand gripping portion 36 extending forwardly and upwardly from the second attachment portion 34. The first and second hand gripping surfaces are preferably connected to each other to provide further structural support.

The angle between the first and second side portions of the first member defines a longitudinal axis extending in the direction of travel of the bicycle. Further, the first, second and third members are each symmetrical about the longitudinal axis. The second member 25 may be attached to the first member 20 with a pair of fasteners 37. The fasteners are simply bolts and nuts which extend through apertures in the first and second members, respectively. The apertures in the first member preferably comprise a first pair of slots 38 which are oriented longitudinally parallel to the longitudinal axis of the first member 20. In that way, the second member 25 may be slid longitudinally forwardly or rearwardly to thereby adjust the position of the first and second forearm support surfaces.

The third member 32 may likewise be attached to the first member 20 with a pair of fasteners 39. The first member 20 includes a second set of slots 40 which are oriented longitudinally parallel to the longitudinal axis of the first member, again to thereby adjust the longitudinal position of the first and second hand gripping surfaces relative to the first member.

The aerodynamic handlebar of the present design is preferably constructed from multiple metallic structural members fastened together as described above. Each of the separate members may be fabricated from a sheet form of structural steel, aluminum, or other bendable material, which has been bended to the appropriate angles and curvatures, as described above and as shown in the drawings. Alternatively, instead of fastening together separate members, the aerodynamic handlebar described above may be fabricated from a single structural sheet member. Furthermore, instead of constructing the device from a bendable sheet metal, the device may be alternatively fabricated from a preformed synthetic material such as high strength carbon fibers and the like.

The invention further includes a means for attaching the device to a bicycle. Referring for example to FIGS. 1 and 4, the means for attaching the steering device to a bicycle may be comprised of a clamp 41 having a downward vertical post attachable directly to the steering post of the bicycle. In this configuration, the aerodynamic steering device presented herein is thereby attached in the closest position (i.e., rearwardly-most position) relative to the rider. Alternatively, the means for attaching the device to a bicycle may comprise a clamp having at least one, and in most cases two, substantially horizontal clamping openings for attaching the steering device to a horizontal portion of a handlebar, wherein the handlebar is then attached directly to the steering post of the bicycle. This type of clamping mechanism is shown, for instance, in U.S. Pat. No. 5,154,095 issued to Edward H. Giard, Jr., which is therefore incorporated herein by reference.

The aerodynamic bicycle handlebar presented herein has been described in specific reference to a preferred embodiment shown in the drawings. Specific details disclosed above and illustrated in the drawings are naturally presented for descriptive purposes. Therefore, specific structural and functional details disclosed above are not to be interpreted as limiting the scope of the invention, but are presented merely as a basis for the claims and for teaching one skilled in the art to variously employ the present invention in any appropriate manner. Changes may be made in the details of construction, arrangement or operation of the invention without departing from the spirit of the invention.

Finally, it should be noted that the applicant herein has also filed an application for a design patent, said design patent application having been filed on the same date and under the same inventor, assignee and title as the present invention. Accordingly, any subject matter disclosed in said design patent application is fully incorporated herein by reference.

What is claimed is:

1. An aerodynamic steering device (17) for a bicycle (10), said steering device comprising:

a first member (20), said first member being an elongated member having a first planar side portion (21) angularly offset relative to a second planar side portion (22), the angle between the first and second planar side portions defining a longitudinal axis extending lengthwise down the elongated member;

a second member (25), said second member having a first central portion (26) angularly offset from a second central portion (27), the angle between the first and second central portions of the second member corresponding to the angle between the first and second planar side portions of the first member, said second member further having a first lateral portion (28) extending laterally outwardly from the first central portion and supporting a first forearm support surface (30), and said second member further having a second lateral portion (29) extending laterally outwardly from the second central portion and supporting a second forearm support surface (31);

a third member (32), said third member having a first attachment portion (33) angularly offset from a second attachment portion (34), the angle between the first and second attachment portions of the third member corresponding to the angle between the first and second side portions of the first member, said third member further having a first hand gripping portion (35) extending forwardly and upwardly from the first attachment portion, and said third member further having a second hand gripping portion (36) extending forwardly and upwardly from the second attachment portion; and, means for attaching the steering device to the bicycle (10).

2. The aerodynamic steering device of claim 1, wherein the first, second and third members (20, 25, 32) are each separate structural sheet members fastened together.

3. The aerodynamic steering device of claim 2, wherein the second member (25) is longitudinally adjustable relative to the first member (20) to thereby adjust the longitudinal position of the first and second forearm support surfaces.

4. The aerodynamic steering device of claim 3, wherein the third member (32) is longitudinally adjustable relative to the first member (20) to thereby adjust the longitudinal position of the first and second hand gripping surfaces.

5. The aerodynamic steering device of claim 1, wherein said means for attaching the steering device to a bicycle is comprised of a clamp (41) including a downwardly extending vertical attachment post for attaching a rearward portion (25) of the first member (20) directly to a substantially vertical steering post on a steering fork of the bicycle.

6. The aerodynamic steering device of claim 1, wherein said means for attaching the device to a bicycle is comprised of a clamp including a substantially horizontal clamping opening for attaching a rearward portion of the steering device to a substantially horizontal portion of a handlebar on the bicycle.

7. An aerodynamic steering device for a bicycle, said device comprising:

a first portion (20), said first portion being an elongated member having a forward end portion (24) and a rearward end portion (23), said rearward end portion including a means for attaching the steering device to the bicycle;

a second portion (25), said second portion extending laterally outwardly from the rearward end portion of the first portion and including first and second forearm support surfaces (30, 31); and, a third portion (32), said third portion extending forwardly and upwardly from the forward end portion of the first portion of the steering device, the third portion including first and second forwardly titled hand gripping surfaces (35, 36);

said first, second and third portions each being comprised of non-hollow metallic sheet material.

8. The aerodynamic steering device of claim 7, wherein the device has a frontal silhouette comprised entirely of thin linear edge surfaces.

9. The aerodynamic steering device of claim 7, wherein the first, second and third portions are comprised of a plurality of separate metallic sheet members fastened together.

10. The aerodynamic steering device of claim 9, wherein:

the first portion (20) comprises an elongated member having a first planar side portion (21) angularly offset relative to a second planar side portion (22), the angle between the first and second planar side portions defining a longitudinal axis extending down the length of the elongated member;

the second portion (25) including a first planar central portion (26) angularly offset from a second planar central portion, (27) the angle between the first and second planar central portions corresponding to the angle between the first and second planar side portions of the first member so that the central portions of the second member fit snugly against the side portions of the first members; and the third portion (32) including a first planar attachment portion (33) angularly offset from a second planar attachment portion (34), the angle between the first and second planar attachment portions (33, 34) corresponding to the angle between the first and second planar side portions (21, 22) of the first portion (20) so that the attachment portion (33) of the third portion (32) fits snugly against the side portions (21, 22) of the first portion (20).

11. The aerodynamic steering device of claim 10, wherein the second portion (25) is adjustable longitudinally along the length of the first portion (20) to thereby adjust the longitudinally position of the first and second forearm support surfaces (30, 31).

12. The aerodynamic steering device of claim 11, wherein the third portion (32) is adjustable longitudinally along the length of the first portion (20) to thereby adjust the longitudinal position of the first and second hand gripping surfaces (35,36).

13. The aerodynamic steering device of claim 7, further comprising foam cushion pads (42) on the first and second forearm support surfaces (35,36).

14. The aerodynamic steering device of claim 7, wherein the means for attaching is comprised of a clamp (41) having a downwardly extending vertical post attachable directly to a steering post on the bicycle.

15. The aerodynamic steering device of claim 7, wherein the means for attaching is comprised of a clamp having at least one substantially horizontal clamping opening for attaching the steering device to a horizontal portion of a handlebar.

* * * * *